Patented Oct. 16, 1934

1,977,211

UNITED STATES PATENT OFFICE 1,977,211

LATEX COMPOSITION AND ITS PREPARATION

Milton O. Schur, Berlin, N. H., assignor to Brown Company, Berlin, N. H., a corporation of Maine No Drawing. Application September 4, 1931, Serial No. 561,256

2 Claims. (Cl. 134—17)

The subject of this invention is the preparation of latex compositions, and more particularly ones commingled or blended with aqueous dispersions of other materials, such compositions being intended for various uses, for instance, as the impregnants of bibulous fibrous foundations in the production of artificial leathers or the like.

There are certain bodies which can be incorporated into solid or coagulated rubber with relative ease by the usual procedure of compounding on a roll mill or in an internal rubber-mixer. Thus, waxy, greasy, and oily bodies lend themselves to such compounding with solid or coagulated rubber. On the other hand, it may be a matter of considerable difficulty to disseminate bodies of this character uniformly throughout aqueous dispersions like rubber latex or artificial aqueous rubber dispersions. Some of the so-called anti-oxidants sold on the market are of a waxy nature and are resistant to direct dispersion in water even in the presence of certain well-known hydrophilic colloidal dispersing agents of the nature of soaps. While it may be possible to disperse such wax-like anti-oxidants under special conditions, i. e., with the use of particular hydrophilic colloids, temperature conditions, and apparatus, nevertheless I have found a positive, simple and inexpensive procedure of getting wax-like anti-oxidants or analogous bodies into aqueous dispersions of a high order of stability and lending themselves to easy blending with other aqueous dispersions, e. g., rubber latex or artificial aqueous rubber dispersions. The dispersion of wax-like anti-oxidants in water is a matter of paramount importance, on account of the fact that such a dispersion may be blended with rubber latex to produce a composition having those qualities requisite for the impregnation of bibulous fibrous foundations in the manufacture of artificial leathers. For some time, it has been known that artificial leathers can be produced by starting with a bibulous fibrous foundation, e. g., one made up of loosely interfelted wood pulp, impregnating such a foundation with rubber latex, and then removing the water by drying so as to cause a coalescence of the rubber particles and a concomitant tenacious bonding of the fibers. One of the troubles which is apt to arise in connection with artificial leathers so made is their deterioration under oxidizing influences, as when merely exposed to the atmosphere. In some instances, this deterioration may not be serious, but it is of great moment when the artificial leather is put to use as shoe uppers or in other connections where the leather undergoes repeated flexings, stretchings, or other mechanical stresses. In these latter instances, the artificial leather may fail in a comparatively short time.

The anti-oxidants to which I have adverted need not necessarily be of a waxy consistency, but there are some which are highly desirable for use in making artificial leathers and which happen to be of a waxy nature. For instance, one anti-oxidant available on the open market and sold under the trade name of "AgeRite Gel" is a waxy material consisting of a mixture of ditolylamines and a special petroleum wax. This anti-oxidant is eminently adapted for use along with water-dispersed rubber in making artificial leathers of the type described, not only because the anti-oxidant retards the deteriorating influence of the atmosphere, but also because it imparts to the artificial leather an enduring pliancy and mellowness highly desired. This anti-oxidant is further a highly desirable one, in that of all the powerful anti-oxidants commercially available, it is the one which causes the least discoloration or staining, particularly on exposure to sunlight, when the leather is surface-finished as with the usual nitrocellulose lacquers.

I have found that waxy anti-oxidants, and more especially "AgeRite Gel", can be brought into fine dispersion in water by an indirect procedure based on an initial absorption of the same by a finely pulverulent carrier preserved substantially as such. The finely pulverulent carrier containing the anti-oxidant distributed therethrough in absorbed condition may then be readily dispersed in water preferably containing the usual hydrophilic colloids. Indeed, the finely pulverulent carrier may be one which it is desired to compound with the rubber anyway, for latex or aqueous rubber dispersions are commonly used along with powdered zinc oxide, lithopone, litharge, or like rubber-compounding agents. In such case, all that is necessary is to cause the absorption by the powdered rubber-compounding agent of the anti-oxidant, whereupon the mixture may be dispersed in water and the water-dispersion admixed with rubber latex or artificial aqueous rubber dispersion. This sort of procedure has been found to work perfectly when powdered zinc oxide, for example, is used as the absorbent carrier or base and as the rubber-compounding agent. I shall, therefore, now give an exemplary procedure in which zinc oxide serves these functions.

To about 5 parts by weight of zinc oxide in the form of dry powder sold under the trade name of "Black Label Kadox" may be added 1 part by weight of the waxy "AgeRite Gel". The batch may be mechanically mixed, during which operation the wax-like material gradually disappears throughout the powder,—so much so that the thoroughly mixed batch no longer contains observably free anti-oxidant and is characterized by a "dry" appearance and a free-flowing quality. By this, I mean that although at the start of the mixing operation the mass may be locally dough-like, nevertheless as the mixing operation continues and the anti-oxidant is distributed through the powder, the particles of zinc oxide again become substantially individualized and can be said to have reverted to their original pulverulent state. The powdered mixture may then be transferred to a ball mill and water may be added thereto during the operation of the mill in amount sufficient to produce a paste or flowable aqueous suspension, at which stage a slight amount of a suitable hydrophilic colloid, e. g., a mixture of ammonium caseinate and gelatine, is preferably added thereto. The operation of the ball mill may be continued until a uniform aqueous dispersion of the mixture has been attained, which result may be had in about an hour or two. Surprisingly enough, the aqueous dispersion thus produced manifests no greasiness whatever, indicating that the anti-oxidant has been very finely dispersed. This dispersion is also remarkably stable in that there is no tendency for greasy particles to become apparent therein over long periods of time. This dispersion, containing, say, 3 parts of water to 1 part of dispersed solids, is ready for commingling with rubber latex in the desired proportions. A typical blend of the dispersion with latex may be made to contain, say, 5% zinc oxide, based on the rubber content of the blend, which would also contain 1% anti-oxidant, based on rubber. The blend may also contain, say, 1½% colloidally dispersed sulphur, based on rubber, and, say, ½% of an ultra accelerator of vulcanization like "Pipsol-X", based on rubber. The sulphur and accelerator of vulcanization may, of course, be incorporated into the rubber latex prior to blending with the water-dispersed mixture of zinc oxide and anti-oxidant. The blend or latex composition thus produced may serve as the impregnant for bibulous fibrous foundations in the production of artificial leathers. For example, a web of loosely-formed wood pulp made on machinery of the papermaking type may be dipped into a blend or latex composition such as described, at a solids content of about 20%, under which conditions rapid impregnation of the web ensues.

The impregnated web may then be dried at elevated temperature to coagulate the rubber and to vulcanize the product. The leather-like product can be surface-finished, as with nitrocellulose lacquer, and embossed to simulate the grain effects of natural leather. The finished leather possesses enhanced stability and resistance to deterioration by virtue of its content of anti-oxidant intimately associated with the rubber throughout the leather. As already indicated, the anti-oxidant also imparts thereto a degree of pliancy or mellowness, which makes easier the lasting and pulling-over operations when the leather is used in shoe uppers. The shoes in which such artificial leather serves as the upper are more comfortable to the wearer, being possessed of the appropriate feel and softness to the foot. In the example cited, the fibrous foundation, after having undergone impregnation in the latex composition, is preferably squeezed to a rubber content of about 100%, based on the weight of dry fiber, as this makes for a finished product having those characteristics desired in shoe uppers.

The latex composition prepared in accordance with my invention may also be used in making dipped rubber goods, as a coating material, in the treatment of textile cords for tire manufacture, in the impregnation of other than fibrous foundations, and in the impregnation of fibrous foundations to produce artificial leathers intended for use as inner soles, outer soles, automobile topping, upholstery fabrics, belting, and other ultimate products.

The principles of the present invention can be applied in making water-dispersions of waxy, greasy, and oily bodies, irrespective of whether or not such bodies are anti-oxidants in character and whether or not the dispersions are to be admixed with latex or other dispersions of water-immiscibles bodies. The dispersed waxy, greasy and oily body may have application as a sizing for fabrics or the like, in which case the powdered material serves not only as a carrier for the water-repellent material, but as a filler or loading ingredient. The water-repellent material may function to impart water-resisting qualities to the fabric to which it is applied. So far as I now know, however, the greatest utility of my invention lies in the possibility of dispersing waxy bodies, preferably of an anti-oxidant nature, in water along with finely powdered rubber-compounding agents, to produce an aqueous dispersion valuable for blending or compounding with rubber latex or artificial aqueous rubber dispersions in manufacturing goods of the class hereinbefore described. In all instances where my invention is applied, the initial step of making the powdered material serve as the carrier for the water-immiscible, waxy, greasy, or oily body is conducted under conditions conducive to a maintenance of the powdered material in substantially dry condition, enabling dispersion in water with no observably free water-immiscible body. While the most stable dispersions are realized by adding a hydrophilic colloid to the water in which the powdered carrier for the waxy, greasy, or oily body is dispersed, nevertheless, a fine suspension of the carrier and the waxy, oily, or greasy substance may be had in water alone. I prefer, however, to use a protective colloid in the water so as to avoid separation of the carrier and the waxy, greasy, or oily body.

Just to show another instance of valuable application of the principles of the present invention, I shall describe how ozokerite or ceresin was dispersed in water and in such condition blended with latex. Both these bodies are considered to be difficultly dispersible in water, but no trouble whatever was experienced in dispersing them according to my method. Ozokerite, which is a comparatively hard wax related more or less to petroleum wax, is considered to act not only as a softening agent for rubber, but also somewhat as a preservative. I observed that this wax, because of its comparatively hard nature, worked into a pulverulent carrier like zinc oxide powder with a little more than usual difficulty. Although matters might have been helped by warming the wax, the zinc oxide, and/or the container in which they were mixed, I found it more convenient to treat the wax with a small amount of volatile softener or solvent like carbon tetrachloride, which could easily be removed by evaporation after the softened wax had been intimately mixed with the powdered carrier. Specifically the procedure may be about as follows: Ozokerite or ceresin may be softened by the addition of a little carbon tetrachloride. It may then be readily admixed with about five times its weight of finely divided zinc oxide. The mixture may then be allowed to remain exposed to the atmosphere until the carbon tetrachloride has been substantially completely volatilized. The resulting dry, free-flowing powder may be transferred to a ball-mill wherein it may be ground in the presence of water containing a small amount of hydrophilic colloid, for example, ammonium caseinate and/or gelatine. After an an hour or two, the mixture will be colloidally dispersed in the water. The aqueous dispersion may now be added to rubber latex in proportion to yield a mixture containing 20% rubber, 5% zinc oxide, 1% ozokerite, 3% sulphur and ½% "Pipsol X", all based on rubber. The mixed dispersion may advantageously be used for the impregnation of bibulous fibrous webs, which, upon drying, are transformed into soft, pliable sheets having leather-like qualities. The use of carbon tetrachloride or equivalent volatile softener or solvent facilitates the distribution of the waxy ozokerite uniformly throughout the pulverulent carrier; and in the event that the presence of the solvent in the final dispersion is undesirable, it can be removed, as already described, by mere exposure of the mixture to the atmosphere. Or, it may be found more convenient to dissolve the waxy body completely in a volatile solvent, whereupon the pulverulent carrier may be added to the solution to form a thin or fluent slurry or cream. The solvent may then be evaporated, with the application of heat, if desired, to hasten evaporation. The resulting dry, free-flowing, powdered carrier containing the residue of waxy material may then be dispersed in water, as previously described.

I claim:

1. A composition of matter comprising a blend of an aqueous rubber dispersion of the nature of latex and a protective-colloid-stabilized aqueous dispersion of a powdered rubber-compounding agent of the character of zinc oxide carrying a mixture of ditolylamines and petroleum wax.

2. A process which comprises mixing about 5 parts by weight of powdered, rubber-compounding agent and about 1 part by weight of a mixture of ditolylamines and petroleum wax until the resulting mixture has a free-flowing quality, dispersing the resulting mixture in water in the presence of a protective colloid, and blending the aqueous dispersion with an aqueous rubber dispersion of the nature of latex.

MILTON O. SCHUR.